F. L. BUENGER.
ASPIRATOR.
APPLICATION FILED AUG. 6, 1917.

1,331,230.

Patented Feb. 17, 1920.

Inventor
Frederick L. Buenger

UNITED STATES PATENT OFFICE.

FREDERICK L. BUENGER, OF CHICAGO, ILLINOIS, ASSIGNOR OF ONE-HALF TO SIGISMUND F. FISCHER, OF CHICAGO, ILLINOIS.

ASPIRATOR.

1,331,230. Specification of Letters Patent. Patented Feb. 17, 1920.

Application filed August 6, 1917. Serial No. 184,688.

*To all whom it may concern:*

Be it known that I, FREDERICK L. BUENGER, a citizen of the United States, residing at Chicago, in the county of Cook and State of Illinois, have invented new and useful Improvements in Aspirators, of which the following is a specification.

This invention relates to apparatus for producing a suction-current of air by the outflow of water from a vessel, and is object is to provide a simple and efficient apparatus of this kind capable of producing a strong suction as will be described in detail hereinafter.

In order that the invention may be better understood, reference is had to the accompanying drawing forming a part of this specification, and in said drawing—

Figure 1:
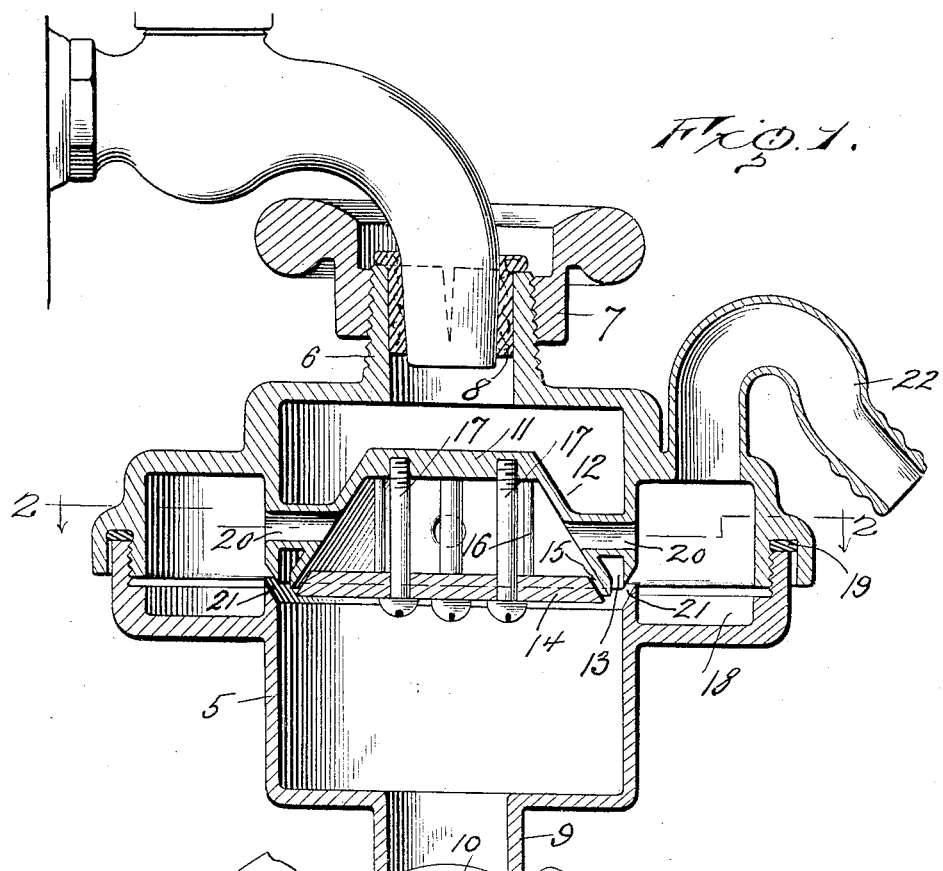
Figure 1 is a vertical section of the device on the line 1—1 of Fig. 2.
Figure 2:
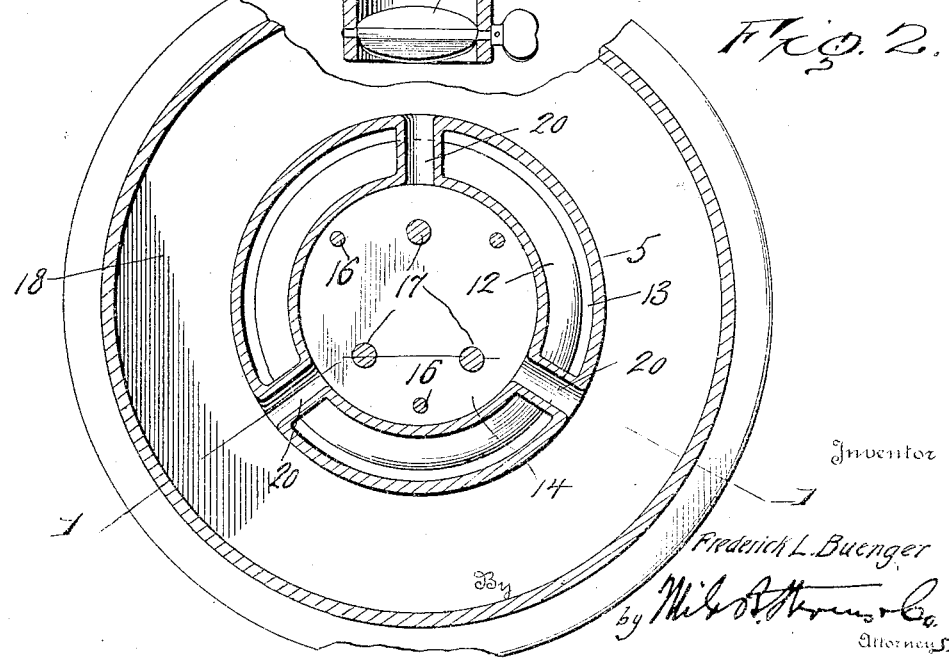
Fig. 2 is a horizontal section on the line 2—2 of Fig. 1.

Referring specifically to the drawing, 5 denotes a chamber, preferably cylindrical in form, and having a water inlet at one end, with a water outlet at the other end. As the apparatus is designed more particularly for domestic purposes, such as a vacuum cleaner outfit, a means is provided for connecting the chamber 5 to the water supply of the house, it being constructed so that it may be attached to one of the faucets. Thus, the inlet end of the chamber 5 has a contracted neck portion 6 provided with suitable means for connection with the faucet. As shown, the neck is split and tapered so that by means of a nut 7 screwed on the outside thereof, it may be drawn together and clamped to the nozzle of the faucet. The interior of the neck contains a washer 8 to make a water-tight joint.

The water outlet of the chamber 5 is also a contracted portion 9 containing a suitable valve 10 to regulate the discharge.

In the chamber 5, between the water inlet and outlet thereof, is mounted a hood comprising a top wall 11 facing the inlet neck 6 and a depending wall 12 inclined toward and terminating close to the cylindrical side wall of the chamber to leave a narrow annular space 13 between the latter and the bottom edge of the wall 12. The hood is closed at the bottom by a circular plate 14 which is spaced at its periphery from the bottom edge of the wall 12, leaving here a narrow annular space 15. Lugs 16 extend between the plate 14 and the under side of the hood top 11, and screws 17 passing through said plate and threaded into the hood top secure the plate in place beneath the hood.

The hood hereinbefore described, forms an air chamber from which air is withdrawn in a manner to be presently described. This air chamber is in communication with a second air chamber 18 which is annular and encircles the chamber 5 on the outside thereof at or about the same level as the hood. The air chamber 18 is preferably formed integral with the chamber 5, and the latter is here divided into upper and lower sections which are connected by screwed joint, with a suitable gasket 19 applied to the joint to prevent leakage of air. Conduits 20 extend radially between the side wall 12 of the hood and the chamber 18, placing the two air chambers in open communication.

The cylindrical wall of the chamber 5, where it forms the inner valve of the chamber 18, has a slit 21 extending entirely around the same and providing an air exit port leading from the chamber 18 into the chamber 5, said port being located directly opposite and close to the space 15, the latter forming a port for the escape of air from the chamber formed by the hood. The space 13 forms a nozzle which intersects the two air ports, the latter being inclined toward the nozzle.

The air chamber 18 has suitable means 22 for attachment of the hose of a vacuum cleaner or other suction apparatus.

In operation, the water upon being turned into the chamber 5 passes through the nozzle 13 and is discharged into the lower end of the chamber from which it escapes past the outlet valve 10. In its passage out of the nozzle 13, the water produces suction at the ports 15 and 21 and the air is therefore withdrawn from the two air chambers from which said ports lead. The valve 10 will be adjusted so that the lower portion of the chamber 5 is always filled with water. This will prevent air from ascending and mixing with the air withdrawn by the suction, to weaken the suction effect. The device will be found especially desirable for operating suction cleaners, as the dust-laden air is discharged with the water.

The air is drawn into the chamber 5 through the two spaced and concentric annular ports 15 and 21 by the passage of the water between the same as it is discharged from the nozzle 13 in an annular stream. The air discharge ports are narrow, and hence a maximum suction effect is produced by the flow of water past the same. The suction is not on a solid stream of air but on two relatively thin annular streams, and the device is therefore made entirely practical for domestic use where the water supply is necessarily limited.

I claim:

1. An aspirator comprising a chamber having an inlet for an aspirating fluid and an outlet for said fluid, and an air chamber located in said chamber between the fluid inlet and the fluid outlet thereof and having an air inlet and an annular air outlet, that portion of the wall of the air chamber having the air outlet being located close to the wall of the first mentioned chamber and the space between said walls defining an annular fluid passageway of restricted area past the air outlet, and a second air chamber encircling the first mentioned chamber and being in open communication with the other air chamber, said second mentioned air chamber having an annular air outlet past which the aforesaid fluid passageway leads.

2. An aspirator comprising a chamber having an inlet for an aspirating fluid and an outlet for said fluid, and an air chamber located in said chamber between the fluid inlet and the fluid outlet thereof and having an air inlet and an air outlet, that portion of the wall of the air chamber having an air outlet being located close to the wall of the first mentioned chamber and the space between said walls defining a fluid passageway of restricted area past the air outlet, and a second air chamber encircling the first mentioned chamber and being in open communication with the other air chamber, said second mentioned air chamber having an air outlet past which the aforesaid fluid passageway leads, said passageway and the air outlets being annular and the passageway being located concentrically between said outlets.

In testimony whereof I affix my signature.

FREDERICK L. BUENGER.